Figure 1:
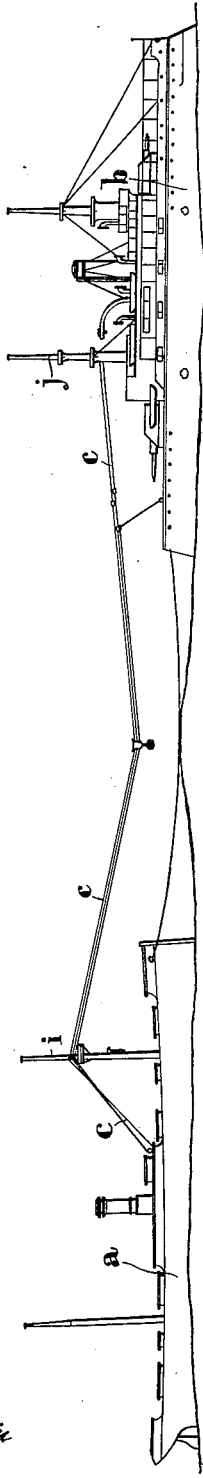

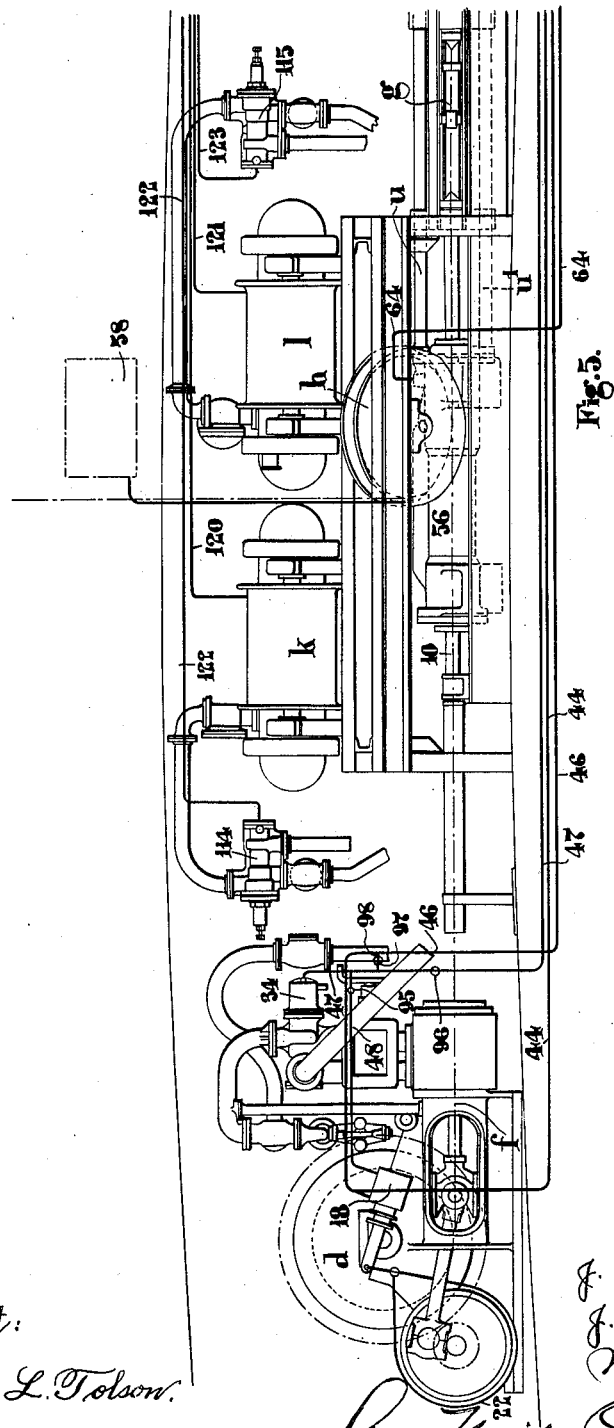

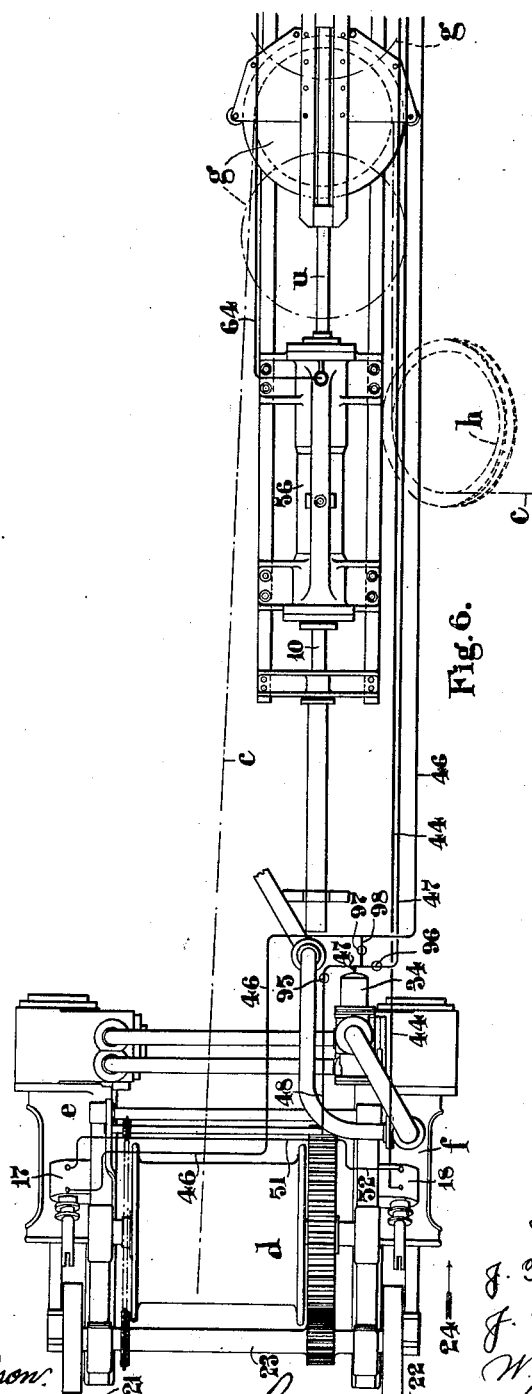

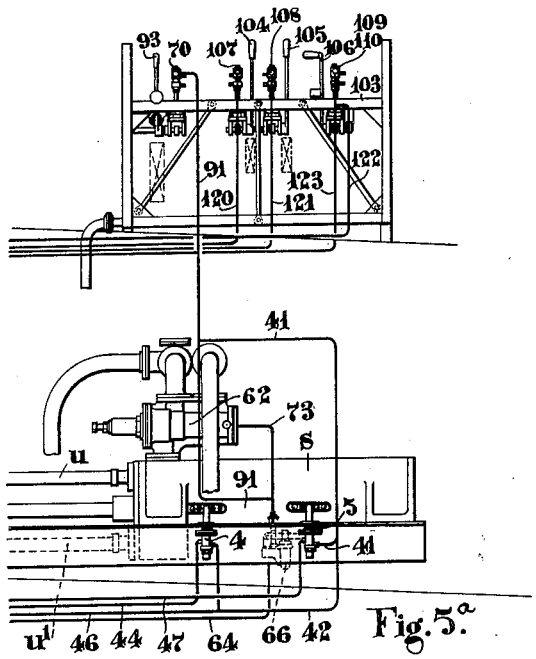
Fig. 5ᵃ
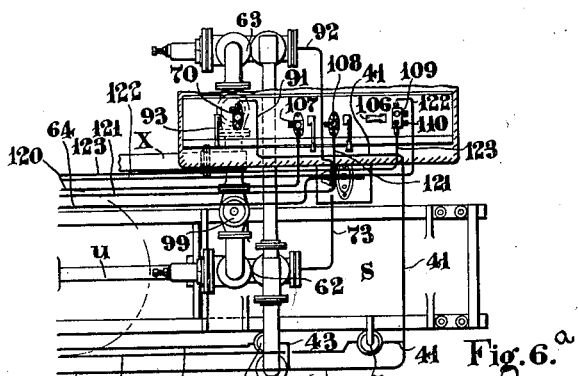
Fig. 6ᵃ

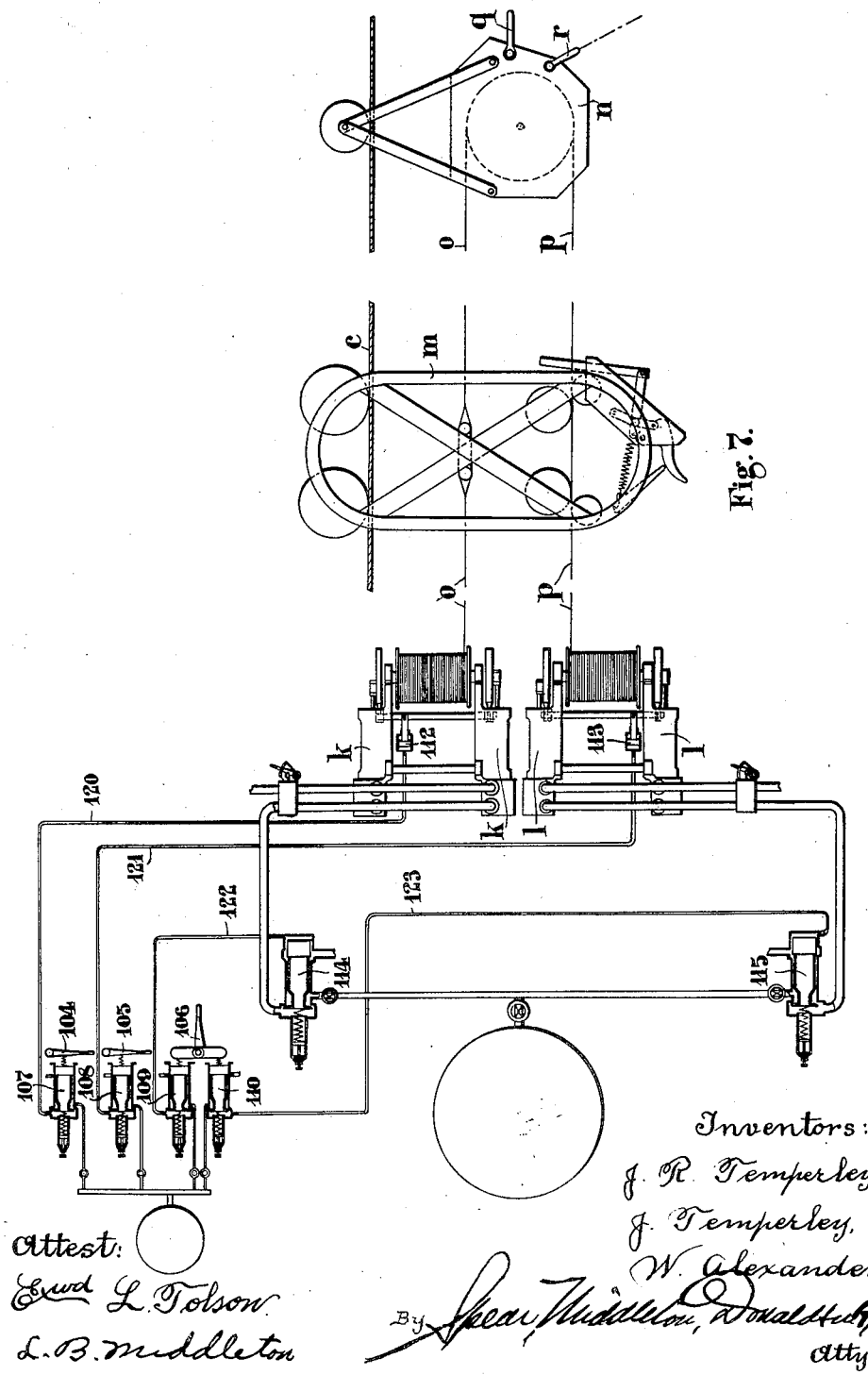

No. 887,873. PATENTED MAY 19, 1908.
J. R. & J. TEMPERLEY & W. ALEXANDER.
CABLE TRANSPORTER.
APPLICATION FILED NOV. 19, 1906.
10 SHEETS—SHEET 9.
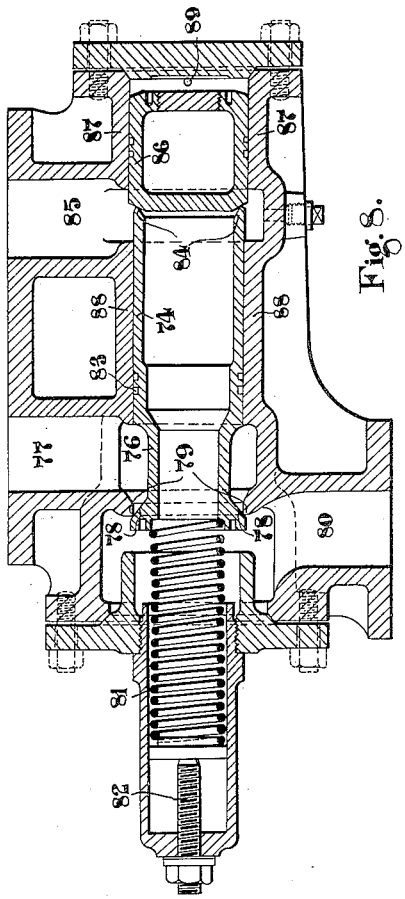
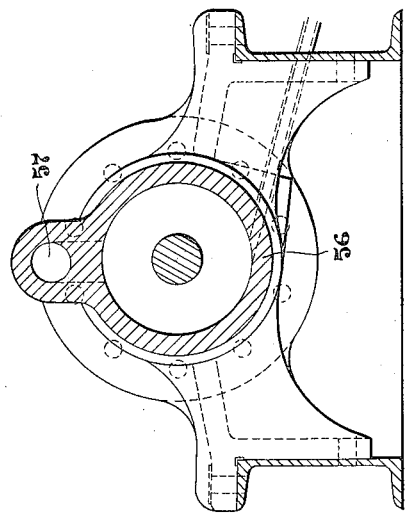
Attest:
Edwd L. Tolson
Edward N. Saxton
Inventors:
J. R. Temperley,
J. Temperley, &
W. Alexander,
By Spear Middleton Donaldson
Attys

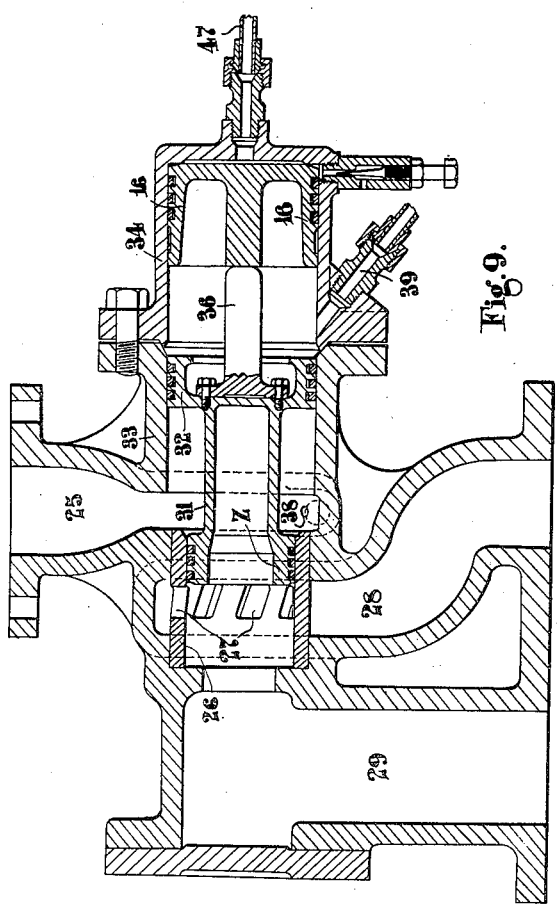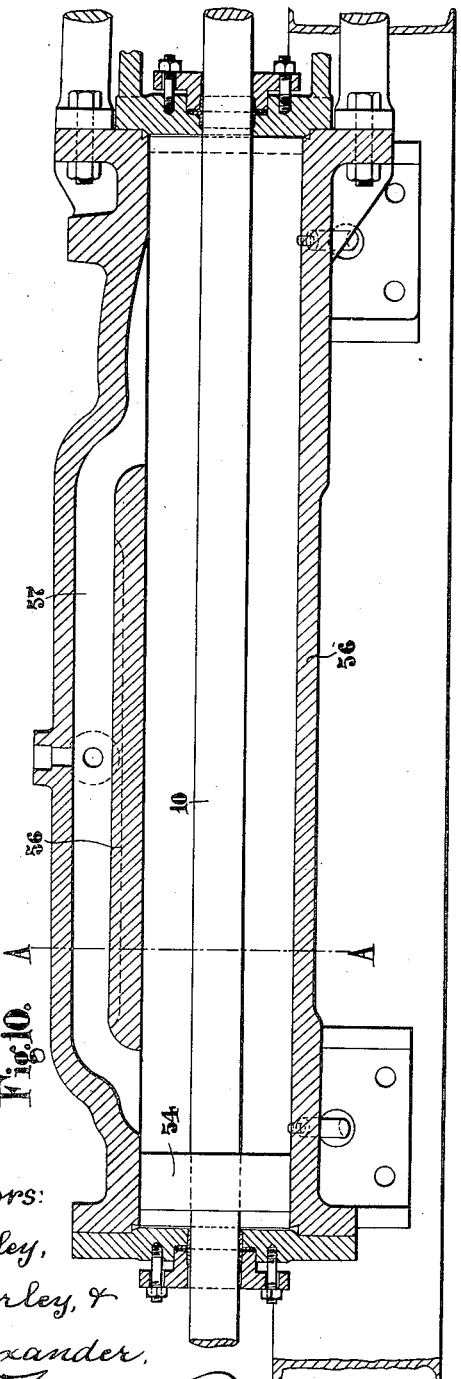

UNITED STATES PATENT OFFICE.

JOHN RIDLEY TEMPERLEY, JOSEPH TEMPERLEY, AND WILLIAM ALEXANDER, OF LONDON, ENGLAND.

CABLE TRANSPORTER.

No. 887,873.          Specification of Letters Patent.          Patented May 19, 1908.

Application filed November 19, 1906. Serial No. 344,099.

*To all whom it may concern:*

Be it known that we, JOHN RIDLEY TEMPERLEY, JOSEPH TEMPERLEY, and WILLIAM ALEXANDER, subjects of the King of Great Britain and Ireland, and residing at 72 Bishopsgate street Within, London, in the county of Middlesex, England, have invented certain new and useful Improvements in and Relating to Cable Transporters, of which the following is a specification.

This invention relates to improvements in transporters of the cable type where the points of support are movable in relation to each other, as is the case for instance, in a transporter for transferring goods between two vessels at sea, or between a vessel and the shore.

The object of the invention is to provide more efficient means for maintaining the requisite tension on the supporting cable so as to sustain the loads while in transit from point to point at a height sufficient to clear intervening objects.

The invention consists broadly in utilizing the movements of a dynamometer actuated by the main or supporting cable to control a winding motor whereby the cable is paid out or hauled in as the tension in the cable increases or decreases.

The invention further consists in means hereinafter described for controlling the various parts of the device.

According to the invention we employ a winding motor of any suitable type having controlling gear for starting and stopping and brakes for holding the rope drum when at rest. One end of the supporting cable is coiled on the drum of the winding motor. The cable is passed through a dynamometer and led over a support at the end of the span but not attached thereto, being left free to run over the support when hauled in or paid out. The cable is then led across the space to be spanned and attached to the support at the other end, or the cable may be carried round a sheave attached to the support and returned across the span and the end attached to a second winding motor by means of which the cable may be hauled in or paid out and this motion utilized for moving the carriage to and fro, the cable serving both to support and to convey the load.

The dynamometer may be of any suitable type having one or more parts which move as the tension on the cable increases or diminishes. Such part or parts are arranged to bring into action, by its or their movement, the controlling gear of the winding motor in such a manner that if the tension of the cable increases owing to movements of the load carried or of the points of support, the motor is caused to pay out the cable until its tension is reduced to the normal amount, the return movement of the dynamometer parts operating the controlling mechanism to stop the winding engine and hold the cable. If the tension of the cable diminishes the movement of the dynamometer parts brings the controlling mechanism into action so as to cause the winding motor to haul in the cable until its tension is increased to the normal amount, whereon the return movement of the dynamometer parts again operates the controlling mechanism to stop the winding motor.

Means may be employed for adjusting or varying the normal tension on the cable by alteration of the pressure or tension-resisting or recording elements of the dynamometer.

Safety devices may be fitted to prevent or limit abnormal movement of the various moving parts in case of exceptional circumstances, such as a breakage of the main supporting cable.

From the above it will be seen that the device which, for convenience we have throughout designated a "dynamometer" performs the functions of, and is in effect, a controlling relay, the primary duty of which is to control the winding motor, so that it shall pay out, wind in or hold the cable, as required. The actual movement of the controlling relay part or parts acted on by the cable may be very small—indeed, too small in itself to lengthen or shorten the cable by more than a very small amount, of the total amount necessary to maintain the requisite tension when the points of support are moving in relation to each other. Any suitable motive power may be used for the winding motor. For transferring the loads across the span any suitable conveying carrier arranged to move on the supporting table and any convenient means of operating the carrier may be used.

Referring now to the accompanying drawings which illustrate one manner of carrying our invention into effect, and form part of our specification.

Figure 2:
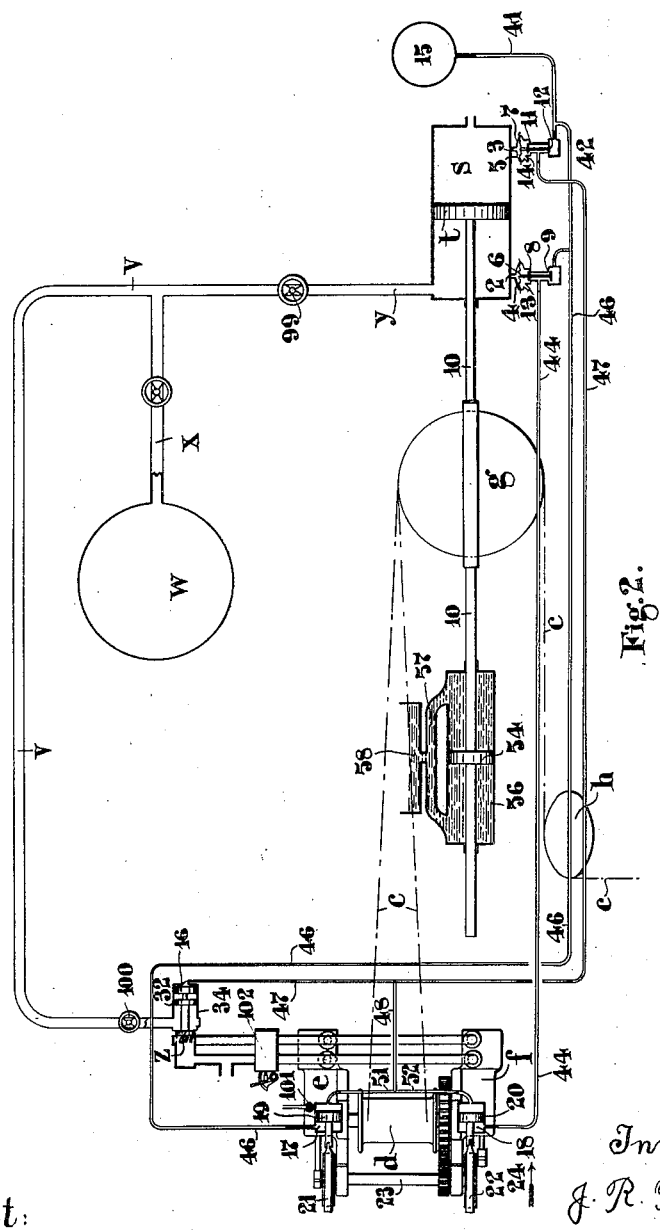
Figure 3:
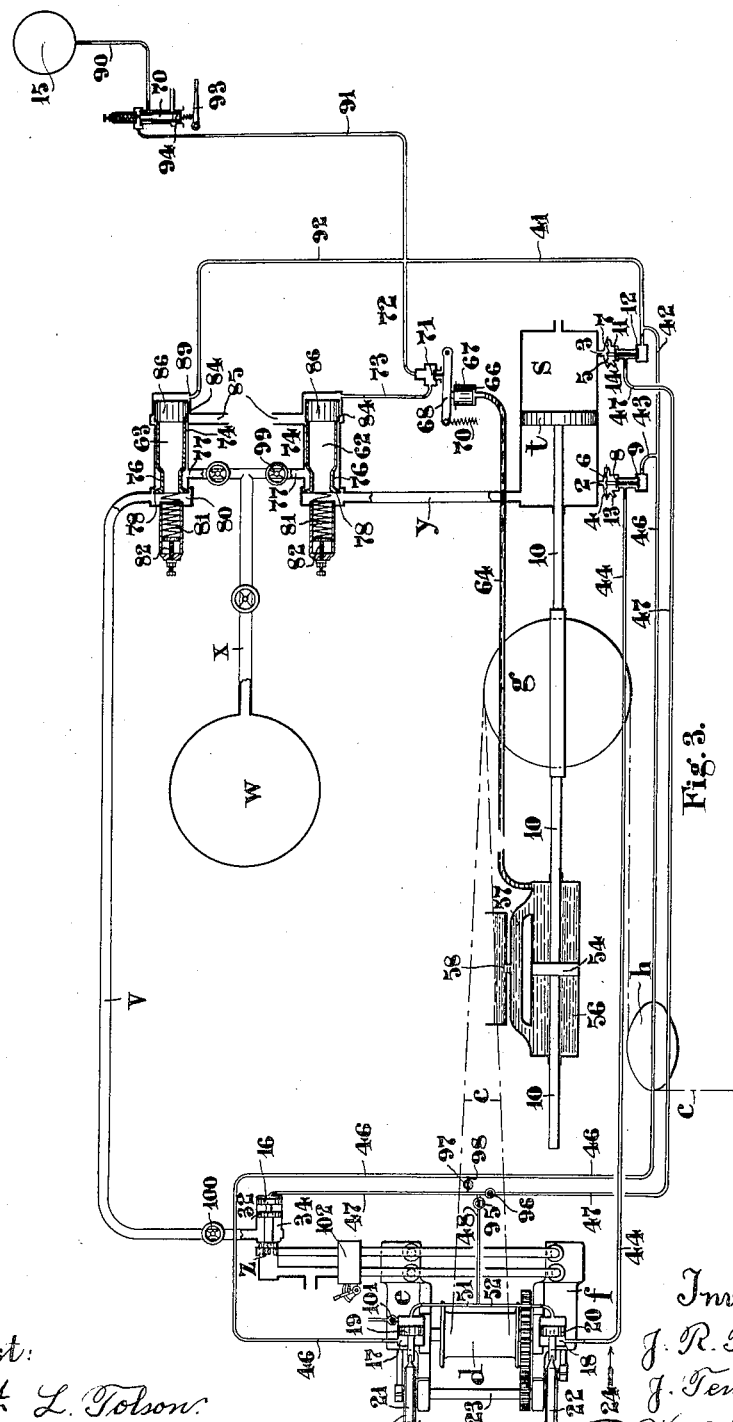
Figure 4:
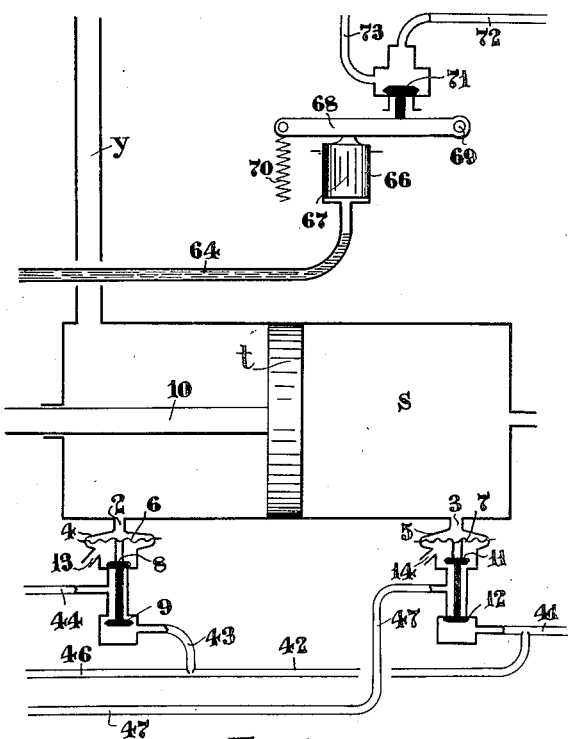

Figure 1 is a diagram of a warship towing a coal vessel, the supporting and transversing cables being carried between them. Fig. 2 is a diagram showing the dynamometer or relay and controlling devices, and, Fig. 3 is a similar diagram showing automatic reducing valves, safety, relay and hand controlling devices included in the plant. Fig. 4 is an enlarged diagrammatic view of the dynamometer or relay cylinder and the safety device. Figs. 5 and $5^a$ show a general arrangement in elevation of a controlling plant according to our invention, showing the main cable winding engines, dynamometer or relay, controlling means and the transporting engines, the latter being supported on a platform or the deck above the dynamometer. Figs 6 and $6^a$ show a plan of the same but with the transporter engines and their supports removed and with some of the piping removed to more clearly display the main cable controlling means. Fig. 7 is a diagram of the transporting carriage, winding engines and controlling means. Fig. 8 is a central longitudinal section to an enlarged scale of a reducing valve of the form which we prefer to employ. Fig. 9 is a similar view to Fig. 8 of a throttle valve for use in controlling the main engines. Fig. 10 is a central longitudinal section to an enlarged scale of a dash pot which we may use with the dynamometer. Fig. 11 is a sectional end view of the same on the line A—A of Fig. 10.

In carrying out our invention according to one manner, as illustrated in the accompanying drawings with special reference to the diagrams, Figs. 1 and 2, for the purpose of coaling ships at sea, we arrange the controlling mechanism on the collier, $a$, which is being towed by a vessel—say a warship $b$. A cable, $c$, hereinafter referred to as the main cable, is coiled on the drum, $d$, of a winding motor consisting of two steam engines, $e, f$, and is passed over a longitudinally movable and guided sheave, $d$, of a dynamometer and thence over sheave, $h$, to another sheave on the mast, $i$, whence it is led across the span between the two vessels and attached to the mast, $j$, of the warship, $b$.

The load carriage, $\overline{m}$, (see Fig. 7) which may be of any convenient construction provided preferably with automatic load-locking and tripping gear forming no part of the present invention, is suspended from the cable, $c$, and is traversed to and fro along the cable by independent winding engines, $k$ and $l$. The engine, $k$, hauls in or pays out the rope, $o$, while the engine, $l$, pays out or winds in the rope, $p$, which is connected to the carriage, $m$, and passed over a tail block, $n$, and back to the winding engine. The tail block is attached to the warship by a tail rope, $q$, and is provided with a pull-down rope, $r$.

The dynomometer consists of a cylinder, $s$, within which is a piston, $t$, the rod, 10, of which carries the sheave, $g$, and is guided upon rods, $u$, $u^1$, (see Figs. 5, $5^a$, 6 and $6^a$). Steam is supplied to the cylinder, $s$, near one end from the boiler, $w$, (Fig. 2) by a pipe, $x$, and pipe, $v$, in such a manner as to force the piston in the opposite direction to that of the pull of the cable. Steam is also supplied by the pipe, $v$, to the casing of a controlling or throttling valve, $z$, of the main cable winding engines, $e$ and $f$.

The cylinder, $s$, is open to the atmosphere at the end remote from the steam inlet and is provided with ports, 2 and 3, situated so that the piston, $t$, may overrun one of them before it reaches the end of its stroke in either direction. These ports open into chambers, 4 and 5, (see Fig. 4) in which are diaphragms, 6 and 7, to which are connected double valve, 8 and 9, and 11 and 12, the chambers between the diaphragms and the valves 8 and 11, being open to the atmosphere through vents, 13 and 14. These valves control a supply of compressed air from a reservoir, 15, to the winding engine brake cylinders, 17 and 18, in which are pistons, 19 and 20, controlling brakes, 21 and 22, on the shaft 23, of the motors, $e$ and $f$. When the pistons, 19 and 20, are moved in the direction of the arrow, 24, the brakes are applied, but when in the opposite direction the brakes are taken off.

The valves 11 and 12, also control the throttle valve, $z$, by controlling the air pressure at the back of a piston, 16, by means of which the throttle valve, $z$, is actuated. A preferred form of the throttle valve is shown in detail in Fig. 9. It consists of a piston, $z$, working in a liner, 26, having ports, 27, communicating with the delivery branch or pipe, 28. The interior of the liner communicates with the exhaust branch, 29. The piston is provided with a reduced extension, 31, at the end of which is a piston, 32, of somewhat larger diameter than the piston, $z$, and slidable in the cylindrical bore of the casing, 33. The piston carries a tail piece, 36. Against the open end of the casing is secured the open end of an air cylinder, 34, in which the piston, 16, slides. The steam supply from the boiler to the valve takes place through the branch 25, situated between the pistons, $z$ and 32. Drains, 38 and 39, are provided to remove water. An air pipe, 47, opening into the end of the cylinder, 34, leads into the passage between the valves 11 and 12 of the dynamometer.

When the valve, $z$, is in the position shown in Fig. 9 the steam supply to the winding engines is closed, the pressure of steam upon the piston, 32, being greater than that of the air on the back of the piston, 16, and the passage, 28, is in communication with the exhaust passage, 29. When, however, the total air pressure on the latter piston exceeds the steam pressure on the former piston the valve, z, is moved to the left to close the communication to the exhaust branch and uncover more or less the ports, 27, thus allowing steam to flow from the inlet, 25, through the liner ports into the branch, 28, to the engines.

Referring again to the dynamometer—so long as the steam pressure on the piston, t, balances the pull of the main cable, the piston remains at rest somewhere between the two ports, 2 and 3, its normal position being that shown in the diagrams, Figs. 2, 3 and 4. Under such circumstances, the steam pressure in the cylinder deflects the diaphragm, 6, downwards, thus holding the valve, 8, closed and the valve, 9, open. The other diaphragm 7, is not deflected and the valve, 11, is open, placing the back of the piston, 16, of the throttle valve in communication with the atmosphere through the vent, 14, and the valve, 12, is closed. Compressed air is then holding the brake, 22, hard on, the air flowing from the reservoir, 15, through pipes, 41, 42, and 43, valve, 9, pipe, 44 to the cylinder, 18 and forcing the piston in the direction of the arrow, 24. The brake, 21 is also held on by the air acting in a similar manner on the piston, 19, in the cylinder, 17, the air passing thereto from pipe, 42, and along the pipe, 46. The two brakes are thus hard on to prevent paying out of the cable, and the throttle valve is closed.

When the tension in the main cable increases it overcomes the total steam pressure on the piston which therefore moves to the left and uncovers the port, 2. The downward pressure on the diaphragm, 6, being then relieved, the valve, 8, is opened and the valve 9, is closed, whereby the compressed air supply to the left side of the piston, 20, of the brake, 22, is shut off and that side of the brake cylinder, 18, is opened to the atmosphere through the vent, 13. The brake, 22, is therefore released, though the brake, 21, is still kept hard on. The brakes are, however, so proportioned that one brake alone is insufficient to prevent the drum of the winding engines from paying out the main cable when the tension in it is excessive. So long as the tension is above the normal, the brake, 21, allows the drum to slip and pay out the cable.

As soon as the tension is reduced so that the steam pressure on the piston slightly exceeds the tension in the cable the piston again returns to the position shown in Fig. 2, and again admits steam to depress the diaphragm, 6, close valve, 8, and open valve, 9, whereby the second brake, 22, is again applied and further slip for paying out of cable is stopped.

When the tension in the cable falls below the normal, the steam pressure forces the piston to the right and uncovers the port, 3. The steam then depresses the diaphragm, 7, closes valve, 11, and opens valve, 12. Compressed air then flows through valve 12, pipe, 47, branch pipe, 48, and branch pipes, 51 and 52, to the right hand end of the brake cylinders, 17 and 18, thereby forcing the pistons, 19 and 20, to the left and releasing the brakes; at the same time also air from pipe, 47, enters the air cylinder of the throttle valve, z, and acting on the piston, 16, opens that valve, z, and starts the engine, winding in cable.

It will be noted that in the above operation the air pressure tending to apply the brakes has not been relieved. As however the piston areas upon which the brake-relieving pressure acts are greater than the area on which the brake-applying pressure acts by amounts equal to the areas of the piston rods, the difference in pressure will relieve the brakes at once. Moreover, as soon as the piston, t, returns to the normal position due to increased tension on cable, and cuts off the pressure on diaphragm, 7, valve, 12, closes, and the valve, 11, opens thereby shutting off air to and opening to exhaust the right hand ends of the cylinders of the throttle valve and brakes. Simultaneously, therefore, with the relief of pressure tending to force the pistons, 16, 19 and 20, to the left the pressure acting on the left hand side of the cylinders becomes unbalanced and forces these pistons to the right thus instantly shutting off steam to the engine and applying the brakes, 21 and 22, to prevent paying out or slip of the cable.

The dynamometer may be provided with a safety means comprising, for example, a piston within a cylinder or dashpot, the two ends of which communicate with one another by a passage of sufficient area to allow a ready displacement of fluid to take place from one side of the piston to the other under ordinary circumstances. The cylinder may be also provided with a pipe of small bore communicating with means adapted to actuate, directly, or through a small relay, a reducing or other valve, whereby the steam to the dynamometer cylinder may be controlled, and in some cases also a reducing valve in the piping to the engine and brake. In the event of a breakdown in the main cable, the sudden increase of pressure occasioned by the excessively rapid movement of the piston in the dashpot cylinder effects the partial or entire closure of the valve which controls the steam to the dynamometer cylinder, and in some cases the control of the steam to the winding engine. A hand controlled relay valve may also be provided whereby these same valves may be controlled at will from any convenient position. Thus as shown in Figs. 2, 3 and 10 we extend the piston rod, 10, beyond the pulley, g, and mount upon it a piston, 54, slidable within a cylinder, 56, the two ends of which communicate with one another by a passage, 57. This passage is of sufficient area to allow a ready displacement of fluid from one side of the piston, 54, to the other under ordinary circumstances, and so that if a sudden shock comes upon the dynamometer, as by the parting of the main cable, the movement of the piston will be checked without an excessively high pressure being produced in the dashpot cylinder. The fluid used is preferably water supplied from an overhead tank, 58.

In Fig. 3 we have shown diagrammatically an arrangement in which a reducing valve, 62, is inserted in the piping to the dynamometer and a reducing valve, 63, in the piping to the winding engine. These reducing valves are preferably of the character shown in detail in Fig. 8. Each of them consists of a tubular body, 74, open at both ends and having a reduced portion, 76, opposite the steam inlet, 77, and an enlarged part, 78, which forms with the ground face, 79, of the casing the actual steam valve controlling the delivery passage, 80. This valve is yieldingly held against the face, 79, by means of a spring, 81, the compression of which may be adjusted to requirements by means of the screw, 82. The cylindrical portion of the body is provided with packing rings, 83, and its end opposite to an exhaust branch, 85, which opens to the atmosphere is ground to form a valve, 84, with the end of an independent piston, 86, slidable within a cylindrical extension, 87, of the valve casing, 88. Compressed air from the reservoir, 15, is admitted to the back of the piston at 89, being supplied to the dynamometer reducing valve, 62, through the pipes, 90, 91, 72, and 73, (Fig. 3) and to the winding engine reducing valve, 63, through the pipes, 90, 91 and 92. It will be seen that these valves act not only as reducing valves but also as discharge or exhaust valves, the escape of fluid taking place through the hollow body, 74, and valve, 84. The pressure of steam in the delivery passage, 80, rises or falls in accordance with the pressure applied to the back of the piston, 86, which applied pressure controls both the steam admission at 79, and the exhaust at 84. By the employment of reducing valves any desired predetermined maximum tension in the cable may be maintained with great certainty.

The control of the air pressure acting on the pistons, 86, of the reducing valves may be effected in any convenient way as by a hand controlled throttle or stop valve in the air supply piping. We prefer, however, to control the valves, 62 and 63, by means of a relay reducing valve, 70, of similar type to the reducing valve, above described, as shown in Fig. 3. A hand controlling lever, 93, is connected through a spring to the piston, 94, of this relay valve whereby the pressure of the air acting on the pistons, 86, of the main reducing valves and through them the pressure of steam supplied to the dynamometer piston and throttle valve and consequently the tension of the main cable may be controlled with great facility. The hand-controlling lever may be arranged to operate in conjunction with a quadrant (not shown) which is graduated to indicate the tensions in the main cable which correspond to certain amounts of movement of the hand controlling lever. This lever, 93, is preferably arranged on a bridge or platform, 103, (see Figs. 5 and 7,) together with the levers, 104, 105, and 106, (see Figs. 5, 5ª, 6 and 6ª) of the reducing valves, 107, 108, 109, and 110, controlling the supply of compressed air through pipes, 120, 121, 122, and 123, respectively to the brake cylinder, 112, of the inhaul engine, $k$, and the brake cylinder, 113, of the outhaul engine, $l$, and the steam reducing valve, 114 and 115, controlling the supply of steam to and exhaust from engines, $k$ and $l$, which operate the transporting cable drums. In some cases the reducing valves, 62 and 63, may be controlled directly by mechanical means instead of by compressed air or other fluid acting on the piston, 86.

The dash pot cylinder (Figs. 5, 5ª, 6 and 6ª) is preferably provided with a pipe, 64, of small bore communicating with a small cylinder, 66, (see Figs. 3 and 4,) in which is a piston, 67, adapted to control through a spring-held lever, 68, pivoted at 69, a valve, 71, in the piping, 72 and 73, thereby one or both of the reducing valves may be automatically controlled from the dash pot in the event of a breakdown of the main cable. Thus should the pressure of fluid in the dash pot rise above an amount predetermined by the adjustment of a spring, 70, the piston, 67, will be raised and the valve, 71, opened. The effect of this with the arrangement of piping shown will be to allow an escape of air through valve, 71, to atmosphere thereby relieving the air pressure acting on the pistons, 86, of the reducing valves, 62 and 63, which consequently close under the compression of the springs, 81, and permitting the steam from the dynamometer cylinder and from the piping, $v$, to blow off through their hollow valve bodies, 74, valves, 84, and exhaust branches, 85, to atmosphere.

In order that the winding engines may be hand controlled independently of the operations of the dynamometer, if so required, we provide valves, 95, 96, and 97 in the pipes 48, 47 and 98, the last mentioned pipe connecting the pipes 47 and 46. We also provide a stop valve, 99, between the pipe, $x$, and the reducing valve, 62, and a stop valve, 100, in the pipe, $v$, before the throttle valve, $z$. The brake cylinder, 17, is provided with an air cock, 101.

When the machinery is working under automatic control, the valve, 97, and air cock, 101, are closed, the others above mentioned being opened. When the independent hand control is required the valves, 96 and 99 are closed, the valve, 97 is opened, the valve, 95 is closed or opened as required to put the brake on or off, the valve, 100, is closed or opened as required to stop or start the engine and the air cock, 101, is slightly opened. The cable winding engines may be provided with a reversing valve, 102, of any ordinary or convenient construction. Any convenient motive power may be used for actuating the apparatus, but we find generally that it is desirable to use the compressed air in the controlling system in preference to steam on account of the greater rapidity of operation that can be obtained with compressed air. The winding drums may be operated electrically the current supply being regulated from the movements of the dynamometer. The dynamometer may be actuated by any suitable fluid.

Having now described our invention what we claim as new and desire to secure by Letters Patent is:—

1. In combination in a cable transporter; a cable; a winding moter therefor; a dynamometer having movements responsive to change of tension in the cable; and means acting to control the winding motor in accordance with movements of the dynamometer, whereby the winding motor pays out or winds in cable as the tension in it tends to increase or decrease respectively.

2. In combination in a cable transporter; a cable; a winding motor; braking means for said motor; a dynamometer having movements responsive to changes of tension in the cable; and means acting to control the supply of energy to the motor and to the braking means in accordance with movements of the dynamometer.

3. In combination in a cable transporter; a cable; a winding engine therefor; a dynamometer including a cylinder, a piston working therein, a sheave-block connected to the piston, said cable being passed over the sheave-block whereby a force is produced tending to move the piston towards one end of the cylinder, and means for admitting pressure fluid to the cylinder to prevent movement of the piston when the tension in the cable is normal; means actuated in accordance with movements of said dynamometer for controlling the winding engine.

4. In combination in a cable transporter; a cable; a winding engine therefor; braking means for said engine; a dynamometer including a cylinder, a piston working therein, a sheave block connected to the piston, said cable being passed over the sheave block so as to tend to move the piston in one direction means for admitting pressure fluid to the cylinder to prevent movement of the piston so long as the tension in the cable is normal; and means actuated in accordance with movements of the dynamometer for controlling the supply of pressure fluid to the engine and braking means.

5. In combination in a cable transporter; a cable; a winding motor therefor, a dynamometer having movements responsive to changes of tension in the cable; a compressed air system, valve means in said compressed air system, means under the control of the dynamometer acting to control said valve means and valve means actuated by the compressed air whereby a supply of fluid to the motor is controlled from the movements of the dynamometer.

6. In combination in a cable transporter; a cable; a winding motor therefor; a dynamometer having movements responsive to changes of tension in the cable; a compressed air system, valve means in said compressed air system, means under the control of the dynamometer acting to control said valve means and valve means actuated by the compressed air whereby the supply of fluid to the motor and to the dynamometer is controlled from the movements of the dynamometer.

7. In combination in a cable transporter; a cable; a winding motor therefor; a dynamometer having movements responsive to changes of tension in the cable; and means acting to control the winding motor in accordance with movements of the dynamometer whereby the winding motor pays out or winds in cable as the tension in it tends to increase or decrease respectively, and means for automatically controlling the supply of energy to the dynamometer.

8. In combination in a cable transporter; a cable; a winding motor therefor; a dynamometer having movements responsive to changes of tension in the cable, means acting to control the winding motor in accordance with movements of the dynamometer whereby the winding motor passes out or winds in the cable as the tension in it tends to increase or decrease respectively and means acting automatically to control the resisting power of the dynamometer to the pull of the cable.

9. In combination in a cable transporter; a cable; a winding motor therefor; a dynamometer having movements responsive to changes of tension in the cable; and means acting to control the winding motor in accordance with movements of the dynamometer whereby the winding motor pays out or winds in cable as the tension in it tends to increase or decrease respectively, a safety device together with means for putting said safety device into operation if the speed of movement of the dynamometer becomes excessive.

10. In combination in a cable transporter; a cable; a winding motor therefor; braking means for the motor; a dynamometer having movements in accordance with variations of tension in the cable; a compressed air system, valves therein; means actuated by the compressed air for controlling the motor and braking means; and means for operating said valves from movements of the dynamometer whereby the motor and braking means are controlled.

11. In combination in a cable transporter; a cable; a winding motor therefor; a dynamometer including a cylinder, a piston in the cylinder, a sheave connected to the piston over which sheave the cable passes and tends to force the piston towards one end of the cylinder, a steam inlet to the end of the cylinder towards which the cable tends to move the piston, an opening to atmosphere at the other end, a port at each end of the cylinder, a diaphragm opposite each port; a compressed air system; valves therein controlled by the diaphragms; means controlled by the compressed air whereby the winding motor is controlled in accordance with the movements of the dynamometer piston.

12. In combination in a cable transporter; a cable, a winding motor therefor; a dynamometer actuated by the cable; a fluid supply pipe to the motor; a stop valve and a reducing valve in the fluid supply pipe; an independent fluid system controlling said reducing valve and means whereby the dynamometer controls the independent fluid system.

13. In combination in a cable transporter; a cable; a winding motor therefor; a dynamometer actuated by the cable; a fluid supply pipe to the motor; a fluid supply pipe to the dynamometer; a stop valve in the first mentioned pipe and reducing valves one in each of said pipes; an independent fluid system controlling said valves and means whereby the independent fluid system is controlled by movements of the dynamometer.

14. In combination in a cable transporter; a cable; a winding motor therefor; a dynamometer actuated by the cable; a fluid supply pipe to the motor; a fluid supply pipe to the dynamometer; a stop valve in the first mentioned pipe and a combined reducing and discharging valve in both of said pipes; an independent fluid system controlling said valves and means whereby the independent fluid system is controlled by movements of the dynamometer.

15. In combination in a cable transporter; a cable; a winding motor therefor; a dynamometer actuated by the cable; a fluid supply pipe to the motor; a fluid supply pipe to the dynamometer, a stop valve in the first mentioned pipe and a combined reducing and discharge valve in both of said pipes; an air cylinder at the back of each combined reducing and discharge valve; an independent compressed air system; a connection from said compressed air system to each air cylinder and valve means in the fluid system under the control of the dynamometer whereby the last mentioned valve and consequently the air pressure system is controlled.

16. In combination in a cable transporter; a cable; a winding motor therefor; a dynamometer actuated in accordance with variations of the tension in the cable; means actuated by movements of the dynamometer whereby the winding motor is caused to pay out or wind in cable according as the tension therein increases or decreases; and means whereby the "normal" tension in the cable may be set to any desired amount.

17. In combination in a cable transporter; a cable; a winding motor therefor; a dynamometer actuated by the cable, said dynamometer having movements in accordance with the changes of tension in the cable; a compressed air system; valves in the compressed air system; valve actuating means actuated by movements of the dynamometer whereby the winding motor is caused to pay out or wind in the cable according as the tension therein increases or decreases and a reducing valve in the compressed air system acting to control the pressure of air in said compressed air system whereby the "normal" tension in the cable may be set to any desired amount.

18. In combination in a cable transporter; a cable; a winding motor therefor; a dynamometer actuated by the cable; a fluid supply pipe to the motor; a stop valve and a reducing valve in the fluid supply pipe to the motor, a fluid supply pipe to the dynamometer; a reducing valve in said pipe to the dynamometer, an independent fluid system controlling said valves, pipe connections from said fluid system to each of said valves, valves in the compressed air system controlling the delivery of compressed air to the motor and dynamometer valves, means under the control of the dynamometer for actuating said valves in the compressed air system and a reducing valve in the compressed air system acting to regulate the air pressure to a predetermined amount whereby the tension in the cable may be set to any desired amount.

19. In combination in a cable transporter; a cable; a winding motor therefor; a dynamometer actuated by the cable, a fluid supply pipe to the motor, a stop valve and a reducing valve in the fluid supply pipe; an independent fluid system controlling said reducing valve; means under the control of the dynamometer acting to control the independent fluid system; and a reducing valve whereby the fluid pressure may be set to a predetermined amount.

20. In combination in a cable transporter; a cable; a winding motor therefor, a dynamometer actuated by the cable; a fluid supply pipe to the dynamometer, a reducing valve in the fluid supply pipe, an independent fluid system controlling said reducing valve, means actuated by movements of the dynamometer acting automatically to control the independent fluid system; and a hand controlled reducing valve in the fluid system whereby the pressure of the independent fluid may be set to a predetermined amount.

21. In combination in a cable transporter; a cable; a winding motor therefor; a dynamometer actuated in accordance with variations of the tension in the cable; means actuated by movements of the dynamometer whereby the motor is controlled; a dash-pot actuated by the dynamometer; and means whereby the supply of energy to the winding engine is controlled when the speed of movement of a dynamometer part becomes excessive.

22. In combination in a cable transporter; a cable; a winding engine therefor; a dynamometer actuated in accordance with variations of tension in the cable; a steam pipe to the winding engine, a stop valve and a combined reducing and discharge valve in said pipe; a steam pipe to the dynamometer; a combined reducing and discharge valve in said pipe to the dynamometer, a brake on the engine; compressed air cylinders and pistons for actuating each of said valves and the brake, compressed air pipes to said cylinders, valve means in said compressed air pipe operable by movements to the dynamometer whereby the engine valve and brake and the supply of fluid to the dynamometer are controlled, a dash-pot actuated by the dynamometer, a relief valve in the compressed air piping and means whereby a predetermined rise of pressure in the dash-pot opens the relief valve and exhausts the air which has been used to hold the operating fluid supply valves open.

23. In combination in a cable transporter; a cable; a winding engine therefor; a steam controlled dynamometer having movements in accordance with the variations in tension in the cable; valves supplying steam to the engine and dynamometer; a compressed air system governing said valves, means actuated by the movements of the dynamometer whereby the compressed air system is controlled, a dash-pot actuated by the dynamometer and means connected with the compressed air system acting to relieve the pressure therein when the speed of movement of a dynamometer part becomes excessive whereby the supply of energy to the motor is controlled.

24. In combination in a cable transporter; a cable; a winding motor therefor; a dynamometer actuated in accordance with variations in the tension of the cable; means actuated by the movements of the dynamometer whereby the motor is controlled; a safety device actuated by the dynamometer and acting to control the supply of energy to the dynamometer and motor when the speed of movement of a dynamometer part becomes excessive.

25. In combination in a cable transporter; a cable; a winding motor therefor; a dynamometer actuated in accordance with the variations of tension in the cable; means actuated by movements of the dynamometer, whereby the motor is controlled; a safety device actuated by the dynamometer and acting to control the supply of energy of the dynamometer when the speed of movement of a dynamometer part becomes excessive.

In testimony whereof, we affix our signatures in presence of two witnesses.

JOHN RIDLEY TEMPERLEY.
JOSEPH TEMPERLEY.
WILLIAM ALEXANDER.

Witnesses:
C. F. RADGLEY,
BERTRAM H. MATTHEWS.